June 20, 1939.   H. H. HANSON   2,163,377
VULCANIZING EQUIPMENT
Filed Sept. 18, 1935
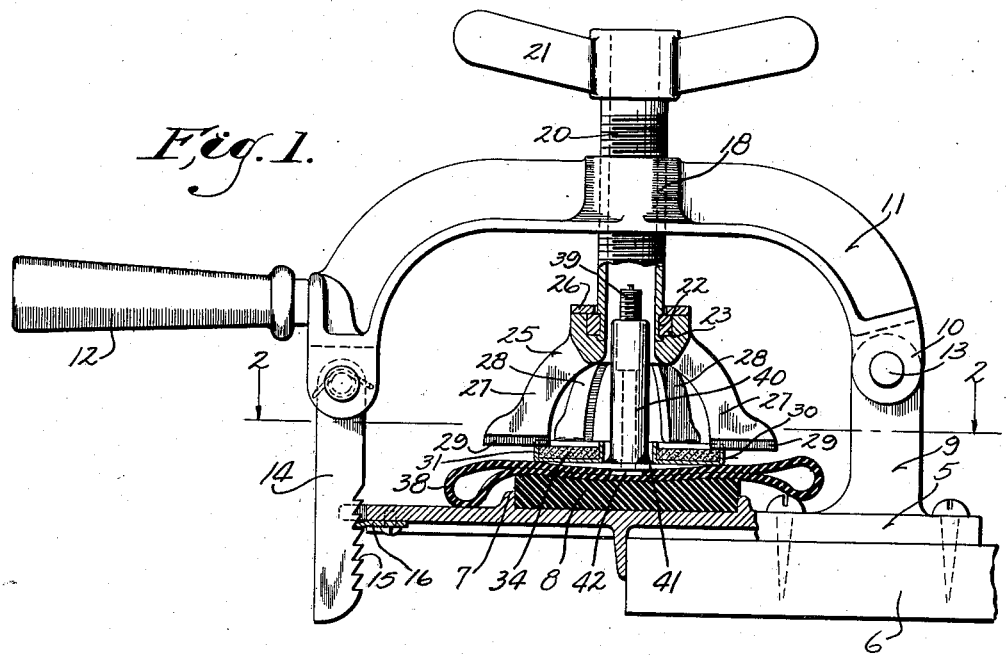
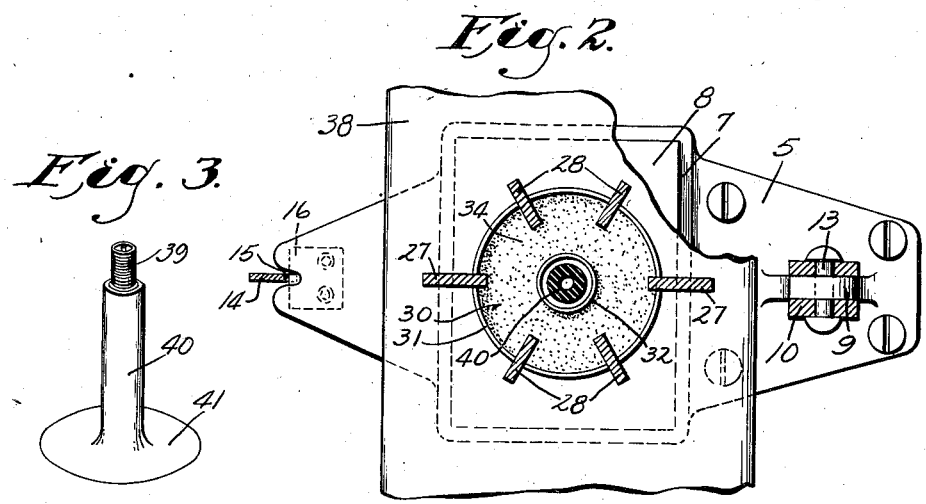
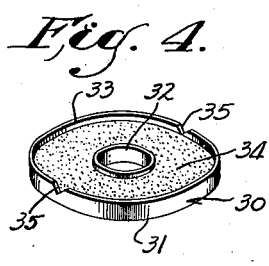
INVENTOR
Harold H. Hanson
BY Wheeler, Wheeler & Wheeler
ATTORNEYS Patented June 20, 1939

2,163,377

UNITED STATES PATENT OFFICE 2,163,377

VULCANIZING EQUIPMENT

Harold H. Hanson, Waupun, Wis., assignor to The Shaler Company, Waupun, Wis., a corporation of Delaware Application September 18, 1935, Serial No. 41,070

5 Claims. (Cl. 18—18)

This invention relates to improvements in vulcanizing equipment.

It is the object of the invention to provide a novel and improved vulcanizer for the purpose of vulcanizing rubber tire stems to inner tubes.

More specifically, I propose by means of the present invention to provide a self contained platen and fuel unit of special annular form co-operating with a special clamp to accommodate the rubber tubular portion of the tire stem during the vulcanizing operation, while fully exposing it for the dissipation of heat in order to confine the heat to the patch portion of the device to localize the vulcanizing effect in the patch without vulcanizing or hardening the stem.

In the drawing:

Figure 1 is a view partially in side elevation and partially in section, showing vulcanizing equipment embodying the present invention.

Figure 2 is a view taken in the plane indicated at 2—2 in Figure 1.

Figure 3 is a detail view in perspective showing the valve stem and patch unit upon which the present device is adapted to operate.

Figure 4 is a detail view in perspective showing the annular platen and heat unit, which comprises a portion of my improved vulcanizing equipment.

Like parts are identified by the same reference characters throughout the several views.

For purposes of illustration, I have shown a bench type clamp which includes a base 5 screwed to a bench 6 and having a rib at 7 for positioning an elastic block or cushion 8 which serves to support the work during vulcanization.

The base carries a standard at 9 to which is pivoted the ear portion 10 of a bridge member 11 having a handle at 12 for its manipulation about the pivot pin 13. The bridge member spans the work and is held in its initial adjustment by means of a pivoted latch 14, and having one margin notched to provide teeth 15 adjustably engaged with a cooperating latch plate 16 carried by the base 5.

The bridge portion 11 of the clamp carries a screw-threaded boss 18 in which the tubular screw 20 is adjustable. The screw has the usual winged head at 21 to facilitate its manipulation, and its lower end is grooved at 22 to receive the annular key 23, by means of which the spider 25 is swiveled to the end of the screw. The spider has an annular shoulder to receive the key 23 and a retaining ring 26 is secured to the spider above the key to maintain the parts in assembly.

The spider 25 has a number of divergent arms 27 and 28, of which the arms 27 are preferably slightly elongated and provided with wedge-shaped extremities 29, as disclosed in Patent No. 1,970,698. The several arms 27 and 28 of the spider engage the platen and fuel unit, generically designated by reference character 30, to hold this unit to the hook. The fuel unit comprises a pan 31 of annular form. Between its concentric inner and outer flanges 32 and 33 is disposed an annular fuel wafer 34 which may be of a composition as disclosed in Patent No. 1,252,909. The outer flange 31 may have notches 35 at appropriate points to receive the wedge-shaped extremities 29 of the elongated legs 28 of the spider 25.

With the clamp opened by the disengagement of the latch member 14 from latch plate 16, the rubber block 8 is exposed to receive the inner tube 38 upon which the valve stem is to be vulcanized. The valve stem shown in Figure 3 has a metal valve fitting 39 at its end, but the valve stem proper comprises a rubber tube 40 provided at its bottom with an integral rubber patch unit or disk 41 prepared for application to and vulcanization to the tube 38. With the tube seated on block 8 the stem patch 41 is positioned thereon with the stem in registry with the opening 42 of the tube. The fuel unit 30 is then slipped over the stem into engagement with the upper surface of the patch and the bridge member 11 of the clamp is manipulated by handle 12 to bring the spider 25 over the valve stem and into engagement with the margins of the fuel unit. In this operation the valve stem will be received into the tubular screw 20.

The latch 14 is now engaged with plate 16 to hold the clamp in adjustment while the screw 20 is manipulated to exert pressure through the spider onto the pan or platen of the fuel unit 20 to compress the patch member 41 into intimate contact with the inner tube 38. The patch 41 is somewhat thicker at its center than at its periphery, but the supporting cushion 8 readily yields to maintain the parts substantially uniformly under pressure.

The fuel 34 is now ignited in the customary manner, and the clamp is allowed to remain in pressure engagement with the work until the vulcanizing operation is complete. In this connection it is particularly desirable to note the fact that whereas circular fuel and platen units have heretofore been known, the shallowness of such a unit and the annular form thereof have a particular function in conjunction with the spider and tubular screw of the present apparatus. The tube 40, being made of rubber, is subject to vulcanization, and if over vulcanized it may be rendered brittle so that its life will be materially shorter than that of the tube to which it is applied. It is very desirable, therefore, in the attachment of a rubber valve stem such as that shown in Figure 3, to avoid the undue heating of stem 40. By reason of the annular form of the platen 34 it is received over the stem 40 without being in contact therewith (see Figure 2). Moreover, the platen unit 30, instead of being a solid mass of material, is an open spider from which heat may readily be dissipated, both by radiation and convection.

Moreover, the formation of convection currents is actually promoted by the use of the tubular screw 20 into which the end of the stem projects. This screw constitutes, in effect, a chimney through which the heated air is allowed to escape, cooler air entering between the legs of the spider at all sides of the vulcanizing platen unit 30.

Thus, it is found that the vulcanizing temperature is localized in the patch 41, and the stem 40 is maintained by air circulation sufficiently cool so that it remains soft and pliable to perform its function as a flexible valve stem.

As soon as the vulcanizing operation is completed the mere disengagement of the latch member 14 releases the work for immediate use, the bridge member 11 being swung aside by means of the handle 12. I am aware of the fact that permanently installed vulcanizers having apertured base platens associated with heating elements have been used to vulcanize rubber valve stems to the inner tubes of vehicle tires. But such vulcanizers have no means for controlling the upward transmission of heat units to the tire tube, and no adequate means for predetermining the number of heat units which will be delivered to the tire tube or to the connecting portion of the valve stem. Also, such vulcanizers are not adapted for use in roadside repairs involving the replacement of a valve stem.

Ascending heat units developed by combustion of fuel are difficult to control, and the effects vary widely under varying conditions of drafts, wind, weather, and external temperature. I believe I am the first to provide a vulcanizer in which a valve stem can be vulcanized in place while in an upwardly projecting and more or less exposed position, and while the number of heat units intended for vulcanization are being delivered into the rubber substantially unaffected by external conditions, and in accordance with requirements predetermined at the factory which supplies the fuel.

I also believe that I am the first to devise means for utilizing chimneying effects to carry away heat units which are not being transmitted in the direction of the material to be vulcanized, and to carry such heat units into the atmosphere in a manner to prevent injury to the valve stem or the tire tube, thereby not only avoiding waste of any heat that can be utilized, but avoiding the effects of excessive heat even in the absence of expert manual control.

I claim:

1. A vulcanizer for attaching valve stems to tire tubes, comprising the combination with a clamping means and a work supporting platen, of an annular upper platen provided with concentric upstanding flanges forming with the base of the platen an annular fuel containing receptacle, said clamping means including a clamping spider centrally apertured to loosely receive a valve stem projecting upwardly through said annular platen, and to provide a chimney for conveying to the atmosphere ascending heat units during combustion of fuel supported by the platen.

2. A vulcanizer having an annular upper platen provided with concentric upwardly extending fuel retaining walls, in combination with a clamping spider provided with a support and engageable with one of the walls to apply clamping pressure to the platen, said spider and its support being formed with a central vertically extending tubular aperture for carrying away ascending heat units and preventing the development of vulcanizing temperatures above the fuel.

3. In a vulcanizer for connecting valve stems to tire tubes, a tubular clamping screw provided with a centrally apertured clamping spider, allowing free flow of air between the spider arms and upwardly through the screw, the spider and the screw being formed to loosely receive a valve stem while its base is being vulcanized to a tire tube by heat developed between the tube and the spider.

4. In a vulcanizer of the described class, the combination with an annular fuel containing upper platen, of a spider for applying pressure to said platen and having an aperture in line with the central platen aperture, and a tubular spider operating screw adapted to receive the upper end of a valve stem, the lower portion of which is encircled by said platen.

5. In a vulcanizer, the combination with a yielding base adapted to serve as a lower platen, of a shallow annular fuel containing upper platen cooperative with said base to receive between them a tire tube and the connecting portion of a valve stem to be vulcanized thereto, and means for clamping the upper platen upon the work, said clamping means being adapted to apply balanced pressure to the platen on all sides of the valve stem and to protect the valve stem from excessive heat during combustion of fuel interposed between the platen and the clamping means.

HAROLD H. HANSON.